2,703,629

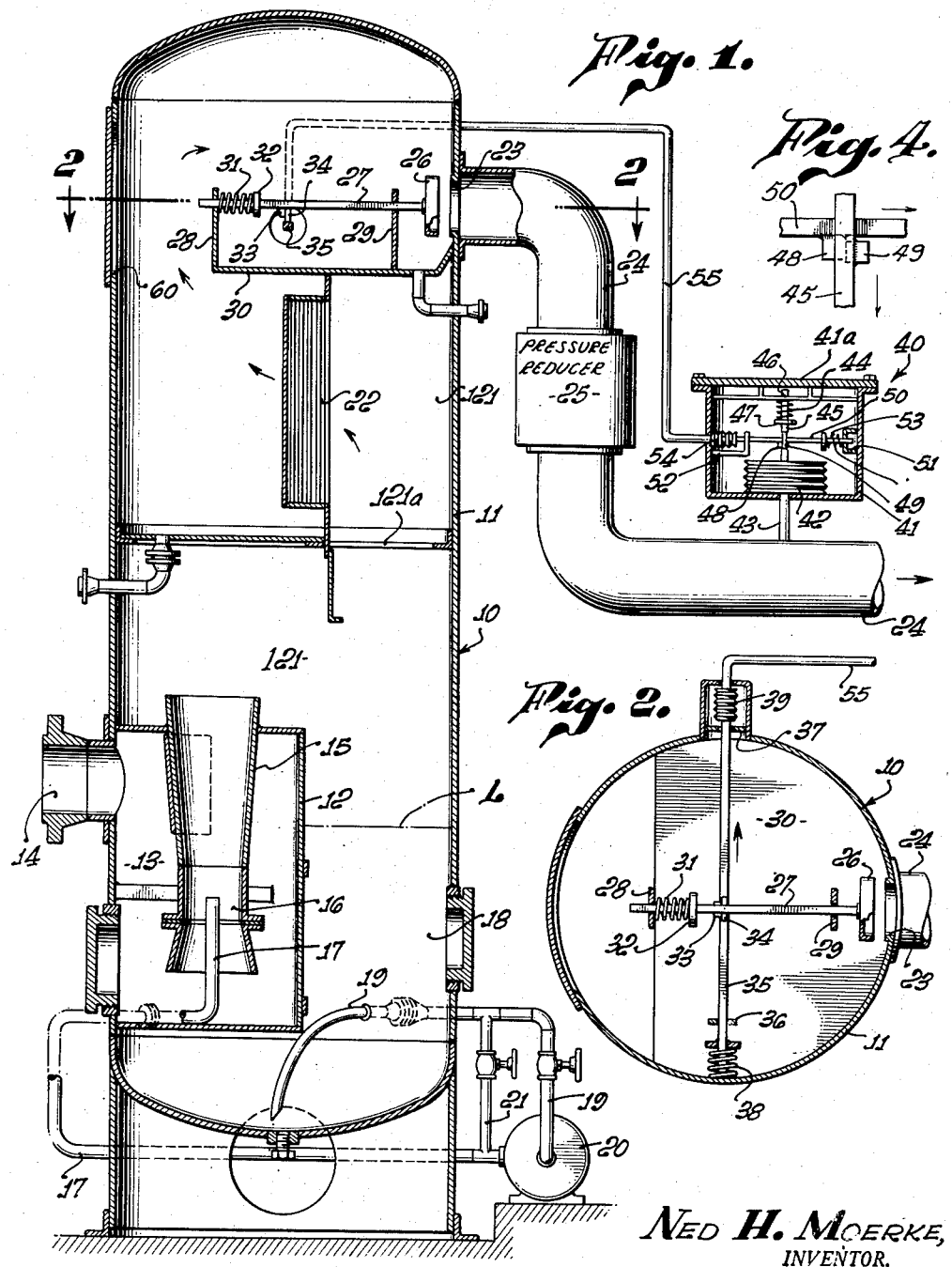
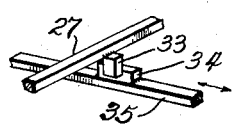

GAS CLEANER CONTROL SYSTEM

Ned H. Moerke, Long Beach, Calif., assignor to The Fluor Corporation, Ltd., Los Angeles, Calif., a corporation of California Application March 3, 1952, Serial No. 274,629

13 Claims. (Cl. 183—41)

This invention has to do generally with the control of gas flow through a line containing a pressure regulator and a gas cleaner or scrubber which, in the broad contemplation of the invention, may be of any suitable type or construction operating to remove either or both liquid and solid entrainment from the gas. More particularly, the invention is directed to a novel system involving the general combination of the cleaner, a pressure regulator connected in the line at one side of the cleaner, and a control system independently connected into the line for automatically closing off the gas flow through the scrubber in the event of performance failure of the regulator.

Pressure regulators are of course generally used in gas supply lines for feeding relatively high or varying pressure gas to the place of use, at substantially constant lower pressure. Malfunctioning of the regulator, such as its failure to reduce the gas pressure, may have serious consequences by reason of passage to any of various appliances designed only for low pressure gas use, of the high pressure gas. The present invention has for its primary object to provide in conjunction with the regulator and a gas separator, a valvular control incorporated in the separator and governed by the gas line pressure or affected by malfunctioning of the regulator, to close off the gas flow through the line.

Considering a typical installation of the gas regulator at the outlet or downstream side of the separator, the invention contemplates connecting into the line downstream from the regulator a pressure responsive device which may be of any suitable fluid, typically a bellows design, operatively connected with the cleaner-contained valve so that upon failure of the regulator, as manifested by an excessive increase of the gas line pressure, the valve will close off the gas flow at the cleaner.

While the valve design, its action and control in relation to the pressure responsive device, may be subject to variation, preferably I employ a normally open valve designed for snap-closing in the direction of the gas flow, and release the valve for closing, in response to fluid pressure transmitted from the control device.

All the various features and objects of the invention, as well as the details of one of its typical embodiments, will be clearly understood from the following detailed description of the accompanying drawing, in which:

Fig. 1 is a general sectional view illustrating the gas scrubber, pressure regulator and shut-off valve control system, Fig. 2 is a cross section on line 2—2 of Fig. 1.

Fig. 3 is a fragmentary perspective showing the interengaging lock relation between parts of the shell-contained valve control mechanism; and Fig. 4 is a similar view showing the interengaging lock arrangement in the control device 40.

At the outset it is to be understood that the invention contemplates the use of any suitable type and form of gas scrubber, and incorporation of the shutoff valve within an appropriate space inside the shell of any suitable scrubber characterized, as such, by its capacity for removing liquid or solid entrainment from the gas flowing through it. Merely as illustrative, I have illustrated at 10 a scrubber of the general type disclosed in United States patent to Stephens et al. No. 2,632,523, issued March 24, 1953, on Gas Separator. The scrubber is shown to comprise a vertically extended shell 11 containing within its lower interior a body of scrubbing liquid, such as oil, standing at an approximate level L.

Offset within the shell and welded thereto is a chamber 12 partially submerged in the liquid L and containing a gas entry space 13 communicating with the scrubber inlet 14. Chamber 12 in turn contains a vertically positioned venturi tube 15 extending through the top of the otherwise closed chamber and having a throat portion 16 which receives the nozzle end of a pipe 17 into which liquid is taken from the oil body 18 through line 19 leading to the pump 20. A valve by-pass 21 interconnects at lines 17 and 19. During operation of the scrubber liquid is continuously taken through line 19 to the pump 20 and discharged through line 17 into the venturi 15, to be intimately admixed with the inlet gas entering chamber 13 and flowing upwardly through the venturi. The resulting liquid and gas mixture is discharged into chamber 121 from which the bulk of the liquid separates from the gas flowing upwardly through opening 121a and a suitable scrubber element 22 to the outlet 23. As illustrated, the outlet connects with a pipe 24 containing a pressure regulator diagrammatically indicated at 25, which may be of any appropriate type operating to reduce the pressure in line 24 to a substantially lower constant value.

The discharge of gas from the scrubber through outlet 23 is controlled by a valve 26 carried by reciprocally movable rod 27 mounted on suitable supports 28 and 29 which may be carried on the baffle floor 30 above the scrubber element 22. The valve is urged in a closing direction by coil spring 31 confined between support 28 and a flange or collar 32 on the rod. Normally the valve is held in open position by engagement of lug 33 on rod 27 with a lug 34 carried on a transverse rod 35 which is reciprocally slidable within supports 36 and 37. Movement of rod 35 in the direction of the arrow and from the neutral position illustrated in Fig. 2, is assisted by coil spring 38. The opposite end of the rod is connected to a bellows 39 expansible by internally applied fluid pressure, as will appear.

The invention contemplates utilization of any suitable control means whereby the bellows 39 may be rendered responsive to variations, and particularly predetermined increase, of the gas pressure in line 24 at the down stream side of the pressure regulator 25. Merely as illustrative, the control system is shown to comprise a pressure responsive device 40 comprising a housing 41 containing a longitudinally or vertically expansible bellows 42 internally connected to line 24 by pipe 43. Expansion of the bellows is resisted by a coil spring 44 placed about rod 45 connected to the bellows, and confined between a stationary portion of the housing at 46 and the rod flange 47. Rod 45 carries a lug 48 which is engaged by lug 49 on a reciprocable rod 50 carried by supports 51 and 52 and urged for movement toward the left by coil spring 53. Rod 50 is terminally connected to a bellows 54 which in turn is connected by a pipe or conduit 55 with bellows 59. The two bellows 39 and 54, as well as line 55, are completely liquid filled so that any appreciable compression of one bellows tends to expand the other.

In considering the operation of the system, assume first the existence of normal pressure and flow conditions, with valve 26 held open by the interengagement of lugs 33 and 34. Gas flowing through the scrubber leaves by way of the outlet line 24, passes through the regulator 25 and is maintained in the line beyond the regulator at substantially constant reduced pressure. Assume next that by reason of some malfunctioning of the regulator, the gas pressure in line 24 beyond the regulator increases beyond a predetermined limit which the regulator is set to maintain. The resulting pressure increase transmitted through pipe 43 expands the bellows 42 against the resistance of spring 44, and in so doing moves lug 48 upwardly and out of holding engagement with lug 49 on rod 53. The thrust of the gas pressure (at upstream regulator pressure) partially counterbalanced by spring 53, allows expansion of bellows 54, lowering pressure in line 55, with resultant contraction of bellows 39. Under these conditions bellows 54 tends to respond by reason of the greater pressure being applied to bellows 39 from chamber 121. Number 37 is simply a support and not a fluid seal. The effect of the pressure decrease is to contract the latter bellows assisted by force of spring 38, displacing lug 34 from holding engagement with lug 33 and freeing valve 26 to be closed by the thrust of spring 31. With the gas flow to the discharge line 24 thus closed off from within the scrubber, the pressure regulator 25 may be inspected for repair or replacement of parts. After the regulator is restored to working order the control mechanism inside the scrubber may be reset to its normal open valve position shown in Fig. 1. Access into the top of the scrubber may be had through the normally closed shell opening 60. Similarly the control parts inside the device 40 may be reset by removing cover 41a of the housing.

It may be further observed that the gas outlet valve 26 may be caused to close not only in response to a pressure increase in line 24 down stream from the regulator, as described, but also in the event of loss of the pressure transmitting fluid in line 55, as from leakage or a break in the line. When for such reasons there occurs a loss of liquid from line 55, depriving bellows 39 of resistance to the thrust of spring 38, the latter displaces rod 35 toward the bellows, shifting lug 34 away from lug 33, and thus causing spring 31 to close the outlet valve.

The drawing is to be regarded merely as illustrative of the invention in one of its typical embodiments, and it is to be understood that the described embodiment is capable of various changes and modifications without departure from the intended spirit and scope of the invention.

I claim:

1. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a gas pressure regulator in said pipe down-stream from said cleaner, a gas pressure actuated device connected to said pipe and responsive to gas pressure surges resulting from malfunctioning of the regulator, and means responsive to actuation of said device for operating said valve.

2. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a gas pressure regulator in said pipe at the outlet side of the cleaner, a gas pressure actuated device connected to said pipe at the downstream side of the regulator and responsive to gas pressure surges resulting from malfunctioning of the regulator, and means responsive to actuation of said device for operating said valve.

3. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a seat for the valve and positioned for closing engagement therewith upon movement of the valve in the direction of the gas flow, a gas pressure regulator in said pipe down-stream from said cleaner, a gas pressure actuated device connected to said pipe and responsive to gas pressure surges resulting from malfunctioning of the regulator, and means responsive to actuation of said device for operating said valve.

4. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a gas pressure regulator in said pipe down-stream from said cleaner, a gas pressure actuated device connected to said pipe and responsive to gas pressure surges resulting from malfunctioning of the regulator, means transmitting fluid pressure in accordance with the operation of said device, and means actuated by said fluid pressure for operating said valve.

5. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a pressure regulator in said pipe down-stream from said cleaner, a gas pressure actuated device connected to said pipe and responsive to malfunctioning of the regulator, means transmitting fluid pressure in accordance with the operation of said device, and means actuated by said fluid pressure and operable to close the valve in response to either predetermined increase or decrease of the fluid pressure.

6. The combination comprising a gas flow pipe, a gas cleaner having an inlet and an outlet connected in said pipe for gas flow through the cleaner, entrainment separating means in the cleaner between the inlet and outlet, a valve in said cleaner above the separating means for controlling the gas flow therethrough, a gas pressure regulator in said pipe down-stream from said cleaner, a gas pressure actuated device connected to said pipe and responsive to gas pressure surges resulting from malfunctioning of the regulator, and means responsive to actuation of said device for operating said valve.

7. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a gas pressure regulator in said pipe down-stream from said cleaner, a gas pressure actuated device connected to said pipe and responsive to gas pressure surges resulting from malfunctioning of the regulator, spring actuated means in said cleaner operable to close the valve, releasable means normally holding said valve open, and means for releasing said holding means in response to actuation of said device by the pipe gas pressure.

8. The combination comprising a gas flow pipe, a gas cleaner having an inlet and an outlet connected in said pipe for gas flow through the cleaner, entrainment separating means in the cleaner between the inlet and outlet, a valve in said cleaner positioned above the separating means to close in the direction of the gas flow within the outlet for controlling the gas flow therethrough, a gas pressure regulator in said pipe down-stream from said cleaner, a gas pressure actuated device connected to said pipe and responsive to gas pressure surges resulting from malfunctioning of the regulator, spring actuated means in said cleaner operable to close the valve, releasable means normally holding said valve open, and means for releasing said holding means in response to actuation of said device by the pipe gas pressure.

9. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a gas pressure regulator in said pipe down-stream from said cleaner, a device connected into said pipe at the outlet side of the regulator and containing a movable element responsive to changes of the gas pressure in the pipe, a line connected to said device for transmitting fluid pressure in accordance with movements of said element, and means in said cleaner operable to close the valve in response to variation of said fluid pressure.

10. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a seat for the valve and positioned at said outlet for closing engagement with the seat upon movement of the valve in the direction of the gas flow, a gas pressure regulator in said pipe down-stream from said cleaner, a device connected into said pipe at the outlet side of the regulator and containing a movable element responsive to changes of the gas pressure in the pipe, a line connected to said device for transmitting fluid pressure in accordance with movements of said element, and means in said cleaner operable to close the valve in response to variation of said fluid pressure.

11. The combination comprising a gas flow pipe, a gas cleaner having an inlet and an outlet connected in said pipe for gas flow through the cleaner, entrainment separating means in the cleaner between the inlet and outlet, a valve in said cleaner for controlling the gas flow therethrough, a gas pressure regulator in said pipe down-stream from said cleaner, a device connected into said pipe at the outlet side of the regulator and containing a movable element responsive to changes of the gas pressure in the pipe, a line connected to said device for transmitting fluid pressure in accordance with movements of said element, movable spring urged means in the cleaner above said separating means for closing the valve, and means releasable in response to variation of said fluid pressure for holding said spring urged means against its valve closing action.

12. A gas cleaner comprising a closed shell having an inlet and an outlet, separating means in the shell for removing entrainment from gas flowing from the inlet to the outlet, a normally open valve in the cleaner between said separating means and said outlet for controlling the gas flow therethrough, a fluid pressure governed control mechanism operatively associated with the valve for effecting its closing movement, said mechanism comprising fluid pressure responsive means communicable with a source of fluid pressure outside the shell and actuable in accordance with that fluid pressure.

13. A gas cleaner comprising a closed shell having an inlet and an outlet, separating means in the shell for removing entrainment from gas flowing from the inlet to the outlet, a normally open valve in the cleaner between said separating means and said outlet for controlling the gas flow therethrough, releasable means normally holding the valve open, and fluid pressure responsive means communicable with a fluid pressure source outside the shell and actuable in accordance with that fluid pressure to release said holding means.

References Cited in the file of this patent

UNITED STATES PATENTS

| | | |
|---|---|---|
| 175,445 | Fish | Mar. 28, 1876 |
| 1,127,242 | Hay | Feb. 2, 1915 |
| 1,177,262 | O'Donnell | Mar. 28, 1916 |
| 1,324,409 | Richardson | Dec. 9, 1919 |
| 1,597,051 | Brown | Aug. 24, 1926 |
| 1,937,855 | Stuard | Dec. 5, 1933 |

FOREIGN PATENTS

| | | |
|---|---|---|
| 839,742 | Germany | May 26, 1952 |